US006754941B2

(12) United States Patent
Schlüsselbauer

(10) Patent No.: US 6,754,941 B2
(45) Date of Patent: Jun. 29, 2004

(54) APPARATUS FOR PULLING A MOLDING RING OFF A NECK OF A CONCRETE TUBULAR WORKPIECE

(76) Inventor: Johann Schlüsselbauer, A-4674, Altenhof am Hausruck (AT)

( * ) Notice: Subject to any disclaimer, the term of this patent is extended or adjusted under 35 U.S.C. 154(b) by 0 days.

(21) Appl. No.: 10/026,250

(22) Filed: Dec. 19, 2001

(65) Prior Publication Data

US 2002/0095757 A1 Jul. 25, 2002

(30) Foreign Application Priority Data

Dec. 19, 2000 (AT) .......................................... 2108/2000

(51) Int. Cl.[7] ................................................ B23P 19/04
(52) U.S. Cl. ........................................... 29/239; 29/255
(58) Field of Search .......................... 29/239, 261, 255, 29/281.1

(56) References Cited

U.S. PATENT DOCUMENTS 4,339,113 A * 7/1982 Vosper ....................... 269/147
5,557,833 A * 9/1996 Pool ............................ 29/261
6,206,355 B1 * 3/2001 Lichtenberg ................ 269/156

FOREIGN PATENT DOCUMENTS

| | | |
|---|---|---|
| AT | 397 939 | 8/1994 |
| DE | 1 195 919 | 7/1965 |
| GB | 2 128 536 | 5/1984 |

* cited by examiner

*Primary Examiner*—Lee D. Wilson
(74) *Attorney, Agent, or Firm*—Collard & Roe, P.C.

(57) ABSTRACT

An apparatus for pulling a molding ring off a neck of a concrete tubular workpiece formed by the molding ring comprises two clamping jaws positioned diametrically opposite each other with respect to a vertical axis of the tubular workpiece, the clamping jaws overlapping the molding ring from above and engaging the workpiece below the molding ring. A supporting structure displaceably supports the clamping jaws, and a lifting device is arranged on the supporting structure for two pull-off catches arranged diametrically opposite each other with respect to the molding ring, the pull-off catches subtending an undercut of the molding ring. According to the invention, carriages are provided for the clamping jaws and pull-off catches, the carriages being adjustable in opposite directions along coaxial guides.

10 Claims, 7 Drawing Sheets

APPARATUS FOR PULLING A MOLDING RING OFF A NECK OF A CONCRETE TUBULAR WORKPIECE

BACKGROUND OF THE INVENTION

1. Field of the Invention

The present invention relates to an apparatus for pulling a molding ring off a neck of a concrete tubular workpiece formed by the molding ring, which comprises two clamping jaws positioned diametrically opposite each other with respect to a vertical axis of the tubular workpiece, the clamping jaws overlapping the molding ring from above and engaging the workpiece below the molding ring, a supporting structure displaceably supporting the clamping jaws, and a lifting device arranged on the supporting structure for two pull-off catches arranged diametrically opposite each other with respect to the molding ring, the pull-off catches subtending an undercut of the molding ring.

2. Description of the Prior Art

Molding rings are used to form centering necks of tubular concrete workpieces and remain on the molded necks while the workpiece is removed from its mold. To enable the molding ring to be pulled off the neck of the at least partially hardened concrete workpiece without impairing the manufacturing tolerances or damaging the tubular workpiece, Austrian patent No. 397,939 proposes to hold the workpiece with clamping pliers positioned diametrically opposite each other with respect to a vertical axis of the workpiece and gripping the molding ring from above, and to pull the molding ring off the firmly held workpiece. A lifting device for pull-off catches is mounted on a supporting structure for the clamping pliers, and the pull-off catches are moved radially inwardly towards the molding ring until they subtend undercuts of the molding ring provided for this purpose. The lifting device then lifts the pull-off catches with the molding ring from the firmly held workpiece. Since the clamping pliers as well as the pull-off catches are freely displaceable, an adjustment drive connecting the pull-off catches for engaging the catches with the molding ring, the molding ring is pulled off the workpiece under favorable load conditions. However, the pull-off catches, which are part of an auxiliary frame connected to the supporting structure by the lifting device, must be angularly offset with respect to the clamping pliers, which requires a structurally determined minimum diameter of the tubular workpiece.

SUMMARY OF THE INVENTION

It is the primary object of this invention to provide an apparatus of the above-indicated type, with which molding rings may be advantageously pulled off the necks of workpieces of smaller as well as larger diameters.

The invention accomplishes this and other objects with an apparatus of the first-described structure, wherein the clamping jaws and pull-off catches are arranged on carriages which are adjustable in opposite directions along coaxial guides.

With this arrangement, the pull-off catches need not be angularly offet with respect to the clamping pliers but may be coaxial therewith on the carriages whereon they are mounted, which carriages are diametrically opposite each other with respect to the vertical axis of the workpiece and are adjustable in opposite directions along radial guides. Such a pull-off apparatus has no limits for the inner diameter of the workpiece since the workpiece is gripped only from the outside by the diametrically opposed clamping jaws.

To avoid bending loads on the workpiece due to the clamping jaws engaging the outside of the workpiece, the clamping jaws are advantageously arranged to engage the tubular workpiece from the outside and are part of clamping pliers gripping the inside and the outside of the tubular workpiece. In this case, the smallest inner diameter of the workpiece is determined by the structure of the clamping pliers whose inner jaws together must be inserted in the bore of the workpiece.

A simple construction is obtained when the clamping pliers comprise double-armed clamping levers linked to the carriages, clamping drives engaging one end of each clamping lever and the clamping jaws being carried by the opposite ends of the clamping levers. In this case, symmetrical load conditions are obtained if the clamping levers comprise two parts pivoted to opposite sides of a carriage body, the clamping jaws being pivotally positioned between the clamping lever parts to obtain a planar engagement of the clamping jaws with the workpiece and a load-free holding grip of the workpiece. This requires the outer clamping levers of the two clamping pliers to be guided outwardly past the pull-off catches to avoid their interfering with each other. To meet this requirement while obtaining favorable levering conditions, the carriage body may have two projections at respective sides of the molding ring, the clamping lever parts being pivoted to the projections.

To enable the lifting forces required to pull the molding ring off the neck of the workpiece to be held to a minimum, it may be necessary under some conditions to loosen the molding ring on the neck. For this purpose, hammers may be provided for the pull-off catches, the hammers being mounted on the carriages at a radial distance from, and outwardly of, the pull-off catches. When desired, the hammers may hit the pull-off catched from below and thus assist the loosening of the molding ring from the neck.

While this is not absolutely necessary, it is useful if the lifting device has a lifting unit associated with each carriage for each pull-off catch since the pull-off catches are arranged on two carriages. Simple constructional conditions are achieved in this case with an apparatus wherein a carrier for each pull-off catch is mounted on the carriages, each carrier being adjustable by a respective one of the lifting units along a lifting guide, and each pull-off catch being pivotally mounted on the carrier for pivoting about an axis extending tangentially to the vertical axis of the workpiece. The pivotal mounting of the pull-off catches on the carriers offers a space-saving adjustability of the catches, which may be lifted for pulling the molding ring off after they have subtended the undercuts of the molding ring. Each lifting guide advantageously comprises a sliding block inserted in a guide recess of a carriage body, and each carrier comprises two carrier jaws connected to the sliding blocks, extending along the sides of the carriage body and projecting upwardly from the carriage body. The lifting unit may be arranged between the two carrier jaws forming the carrier for a respective one of the pull-off catches and is supported, on the one hand, by the carriage body and, on the other hand, engages the clamping jaws. This produces a compact, symmetrical structure combining a favorable use of space with good load conditions.

BRIEF DESCRIPTION OF THE DRAWING

The above and other objects and advantages of the invention will become more apparent from the following detailed description of a presently preferred embodiment thereof, taken in conjunction with the drawing wherein.

DESCRIPTION OF THE PREFERRED EMBODIMENT

Figure 1:
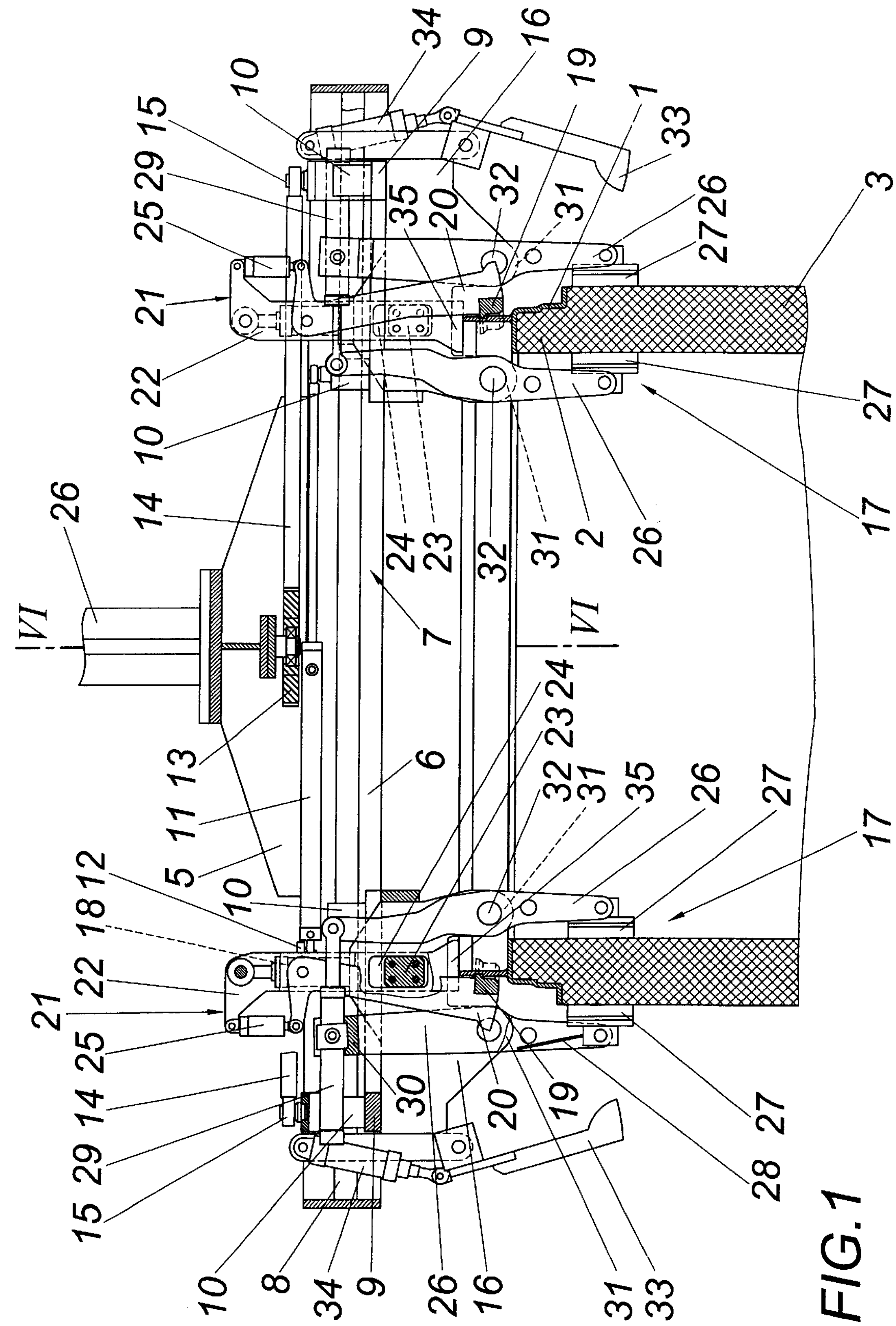
FIG. 1 shows a simplified axial section of an embodiment of the apparatus, with two clamping pliers.
Figure 1A:
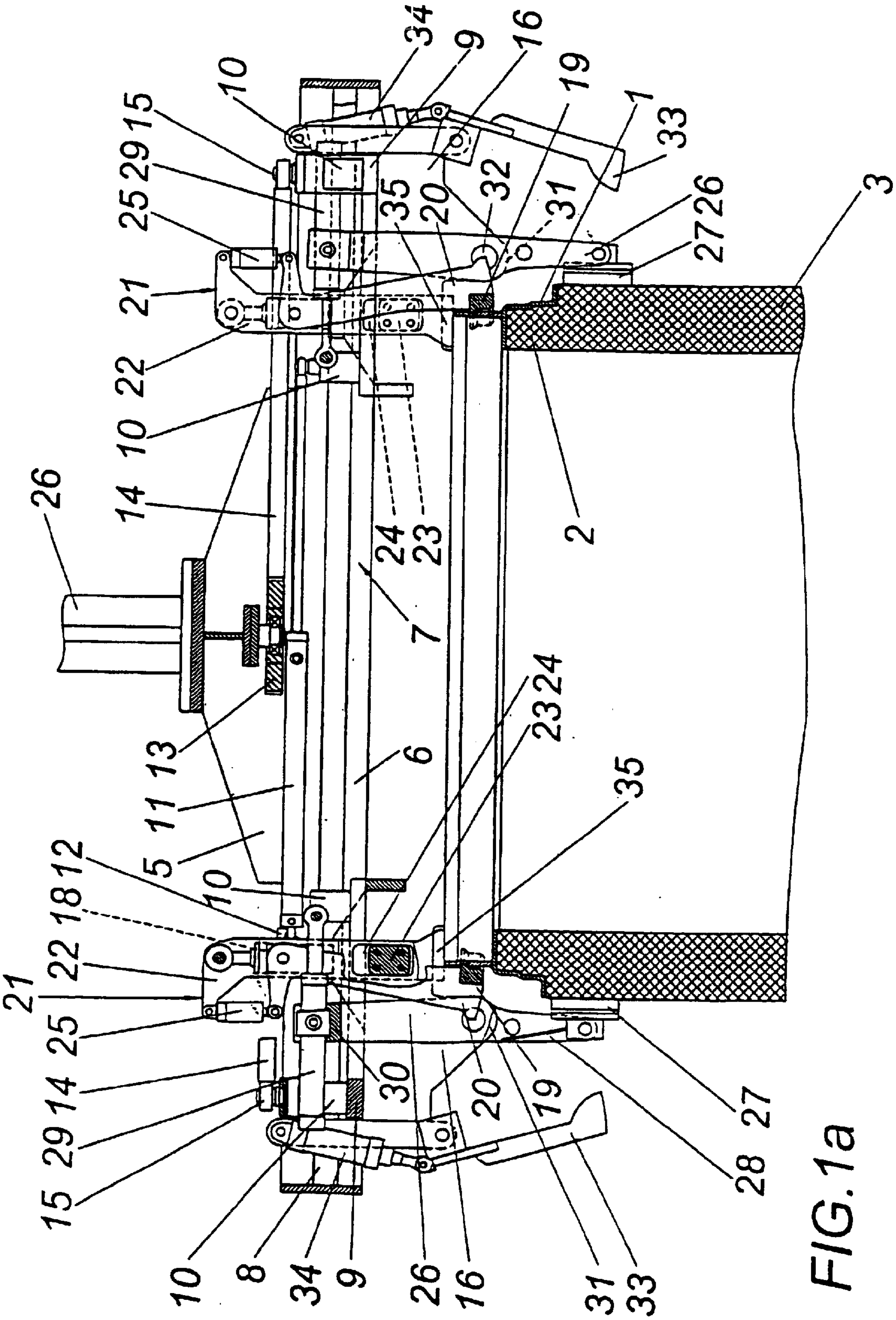
Figure 2:
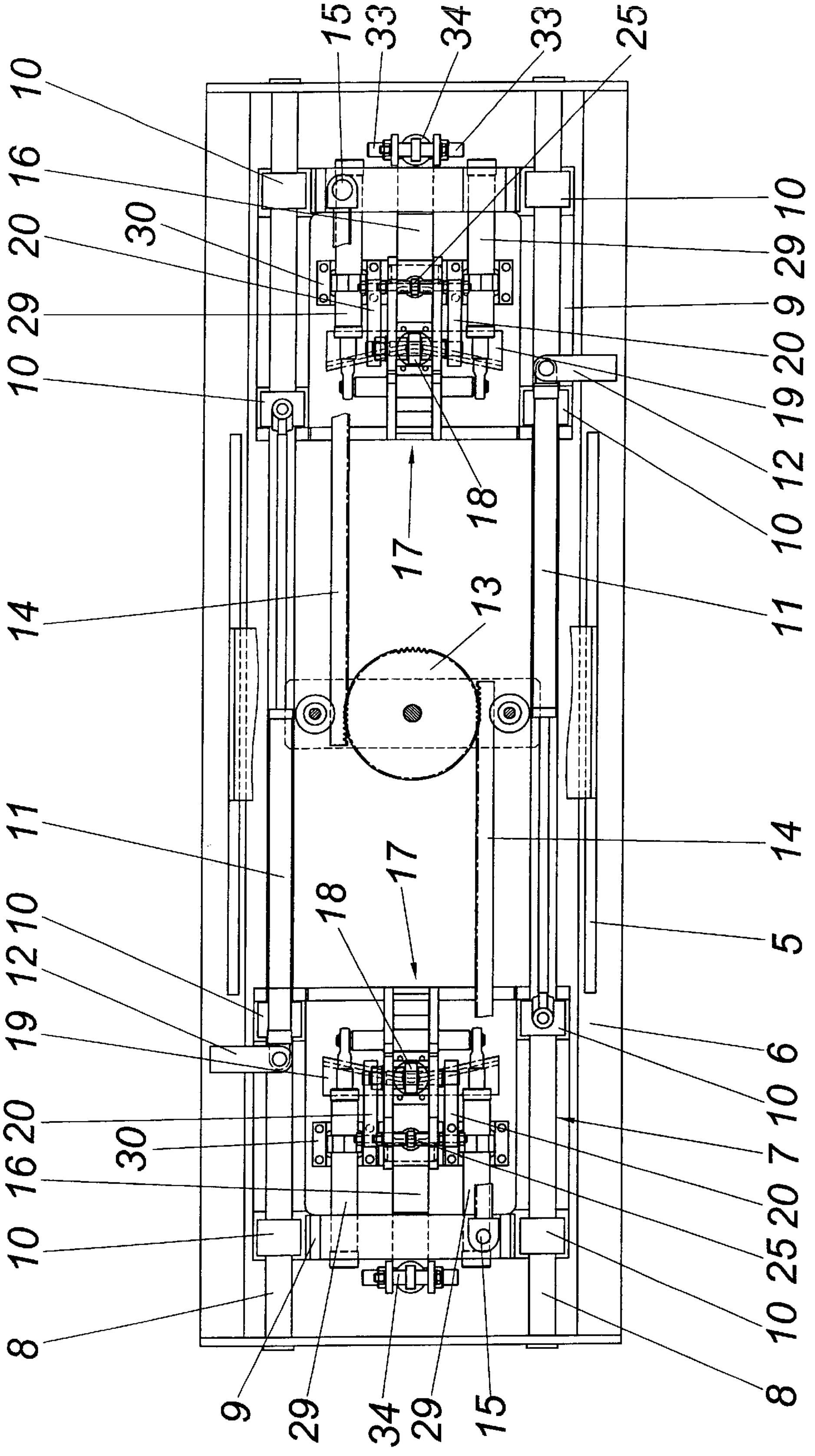
FIG. 2 shows the apparatus is a partly uncovered top view.

As shown in FIG. 1*a*, illustrated apparatus for pulling molding ring 1 off neck 2 of concrete tubular workpiece 3 formed by the molding ring comprises two clamping jaws 27, 27 positioned diametrically opposite each other with respect to a vertical axis of tubular workpiece 3, the clamping jaws overlapping molding ring 1 from above and engaging the workpiece below the molding ring from the outside. Supporting structure 5 displaceably supports the clamping jaws. Lifting device 4 is arranged on supporting structure 5 for two pull-off catches 19 arranged diametrically opposite each other with respect to molding ring 1, the pull-off catches subtending an undercut of the molding ring.

According to the present invention, carriages 9 for clamping jaws 27 and pull-off catches 19 are adjustable in opposite directions along coaxial guides. As shown in the drawing, supporting structure 5 is flanged to lifting device 4 and comprises frame 6 having guide 7 extending between its sides parallel to its longitudinal extension. The guide is constituted by two guide rods 8 for the two carriages 9 whose guide bearings are designated by the numeral 10. Adjustment cylinders 11 are connected to the carriages to adjust them in opposite directions along the guides. One end of the adjustment cylinders engages frame 6 with bracket 12 while an opposite end is engaged in the guide bearing 10 for each carriage 9. The carriage movements are synchronized by a synchronization control comprised of gear 13 mounted on supporting structure 5 and two racks 14 meshing with the gear, the racks being linked to carriages 9 by articulated links 15. Accordingly, the two carriages may be adjusted only in opposite directions and symmetrically along guide rods 8.

FIG. 1 is identical with FIG. 1*a*, except that clamping jaws 27 arranged to engage tubular workpiece 3 from the outside form clamping pliers 17 with additional clamping jaws 27 gripping the inside of the tubular workpiece. The clamping pliers comprise double-armed clamping levers 26 linked to the carriages, clamping drives 29 engaging one end of each clamping lever and clamping jaws 27 being carried by the opposite ends of clamping levers 26. The clamping levers comprise two parts pivoted to opposite sides of carriage body 16, clamping jaws 27 being pivotally positioned between the clamping lever parts. As best shown in FIG. 1, spring 28 biases clamping jaws 27 into a base position and clamping drives 29 actuate the clamping pliers to pivot the clamping jaws against the spring bias. In the illustrated embodiment, the clamping drives are cylinders engaging the free ends of the clamping lever parts. The parts of outer clamping levers 26 are connected by transverse bridge 30 to support the clamping cylinders. Carriage body 16 has two projections 31 for articulated bearings 32 at respective sides of molding ring 1, the parts of clamping levers 26 being pivoted to the projections.

The apparatus further comprises hammers 33 for pull-off catches 19, the hammers being mounted on the carriages at a radial distance from, and outwardly of, the pull-off catches. Hammers 33 are linked to carriage body 16 and are actuated by impact cylinders 34 to be able to hit pull-off catches 19 engaging molding ring 1 from below. As illustrated, hammers 33 may be pivotal hammers or they may consist of impact cylinders whose impact pressure may be favorably adjusted.

The structure of the two carriages 9 is the same. Each carriage comprises a central carriage body 16 on which clamping pliers 17 and the lifting device having lifting unit 18 for each pull-off catch is mounted. A carrier 21 is provided for each pull-off catch 19 which is linked to the carrier by bell-crank lever 20 for pivoting about an axis extending tangentially to the vertical axis of the workpiece. Each carrier 21 is adjustable by a respective one of lifting units 18 along a lifting guide. Each lifting guide 18 comprises a sliding block 23 inserted in guide recess 23 of carriage body 16, and each carrier 21 comprises two carrier jaws 22 connected to the sliding blocks, extending along the sides of the carriage body and projecting upwardly from the carriage body. Sliding blocks 23 are vertically displaceable. Carrier 21 is adjusted in the lifting guide by lifting unit 18, which may be a conventional hydraulic jack and is supported, on the one hand, on carriage body 16 and is linked, on the other hand, to carrier 21 between carrier jaws 22. Pivoting cylinder 25 connects carrier 21 and bell-crank lever 20 to pivot the bell-crank lever for pull-off catch 19.

The above-described apparatus is operated in the following manner:

To pull molding ring 3 off neck 1, the apparatus is aligned with workpiece 3 before, depending on the diameter of the workpiece, carriages 9 with clamping pliers 17 are so adjusted by adjustment cylinder 11 that clamping pliers 17 overlap molding ring 1 and grip the outside and the inside of workpiece 3 below the molding ring when lifting device 4 lowers supporting structure 5. The descent is limited by stops 35 sitting on molding ring 1, which must be associated with lifting units 18 to make it possible to pull the molding ring off the workpiece. According to the illustrated embodiment, these stops 35 are formed by elongating clamping jaws 22 of carrier 21 of pull-off catches 19 downwardly.

Figure 3:
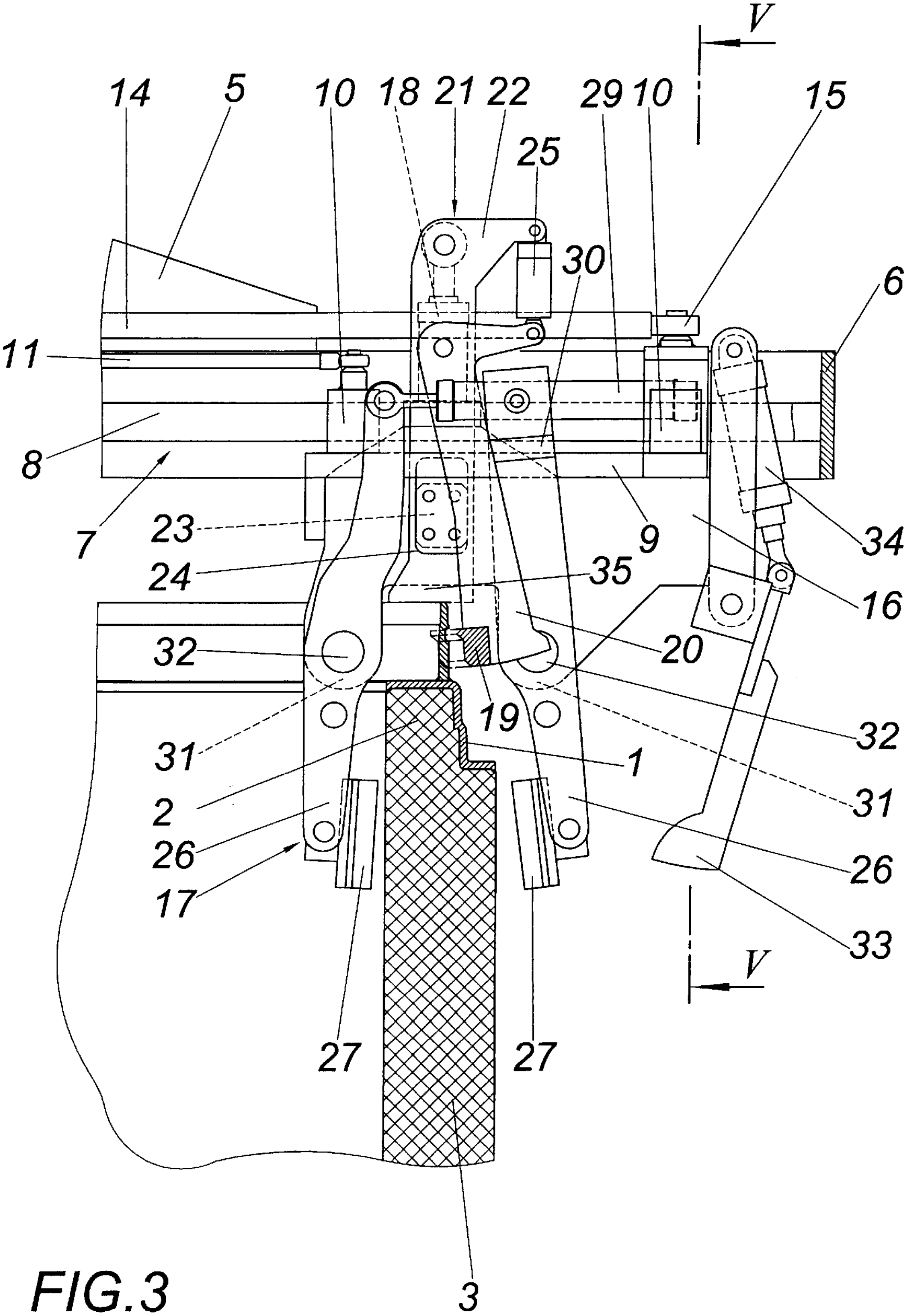
FIG. 3 is a fragmentary, enlarged side view illustrating the carriage for the clamping jaw and a pull-off catch in greater detail.

FIG. 3 shows the position of clamping pliers 17 and pull-off catches 19 after stops 35 have been set on molding ring 1. After clamping drives 29 have been actuated to clamp workpiece 3 to clamping pliers 17, pull-off catches 19 are pivoted into engagement with loading ring 1 until they subtend the undercut of the molding ring. This adjustment of the pull-off catches is effectuated by actuating pivoting cylinders 25. In this position, which is illustrated in FIG. 1, lifting units 18 are actuated to pull the molding ring off by lifting carriers 21 and bell-cranks levers 20 connecting pull-off catches 19 thereto so that the pull-off catches are lifted with respect to clamping pliers 17. This position is shown in FIG. 4.

Figure 4:
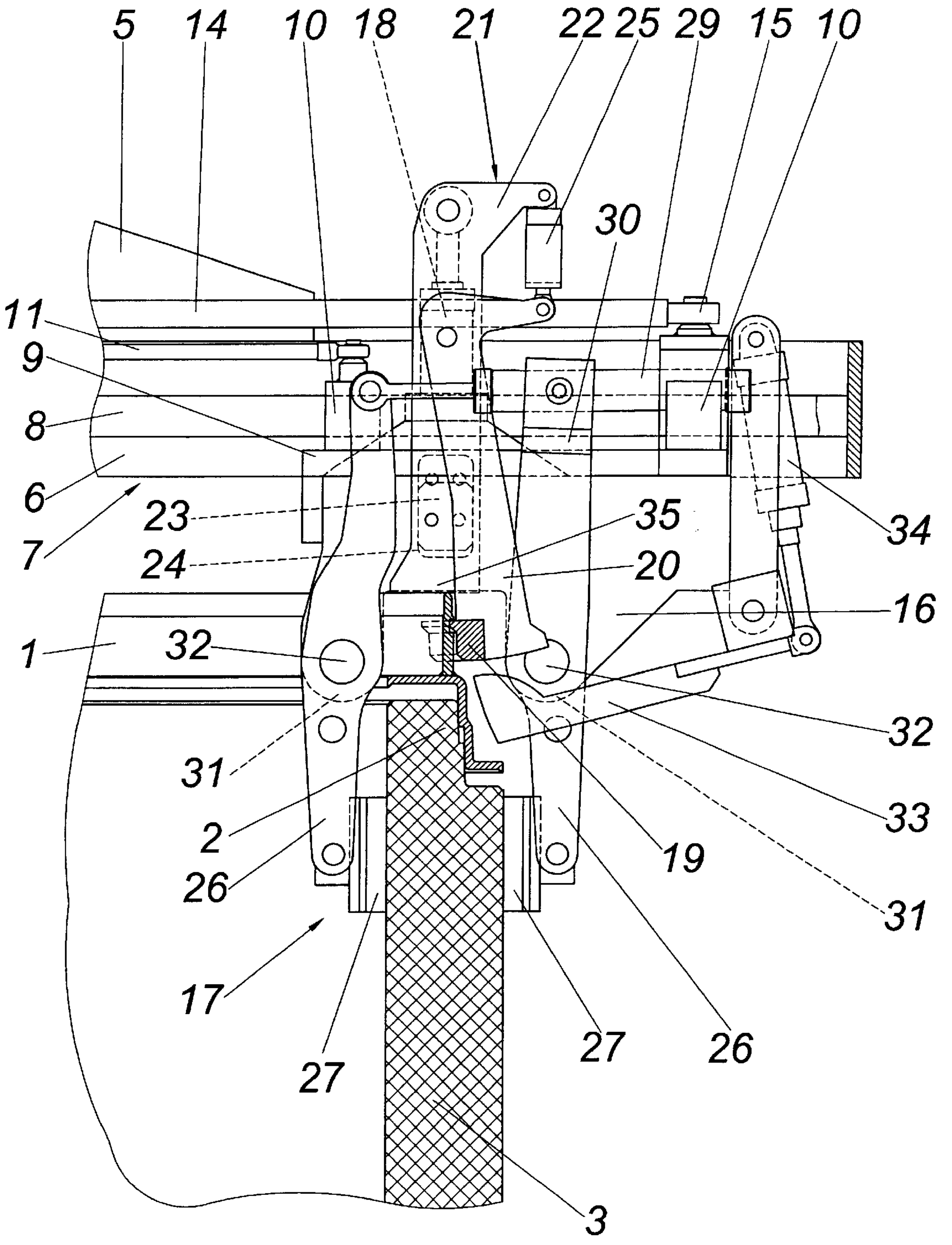
FIG. 4 is a like view showing the clamping jaw and pull-off catch in a different operating position.
Figure 5:
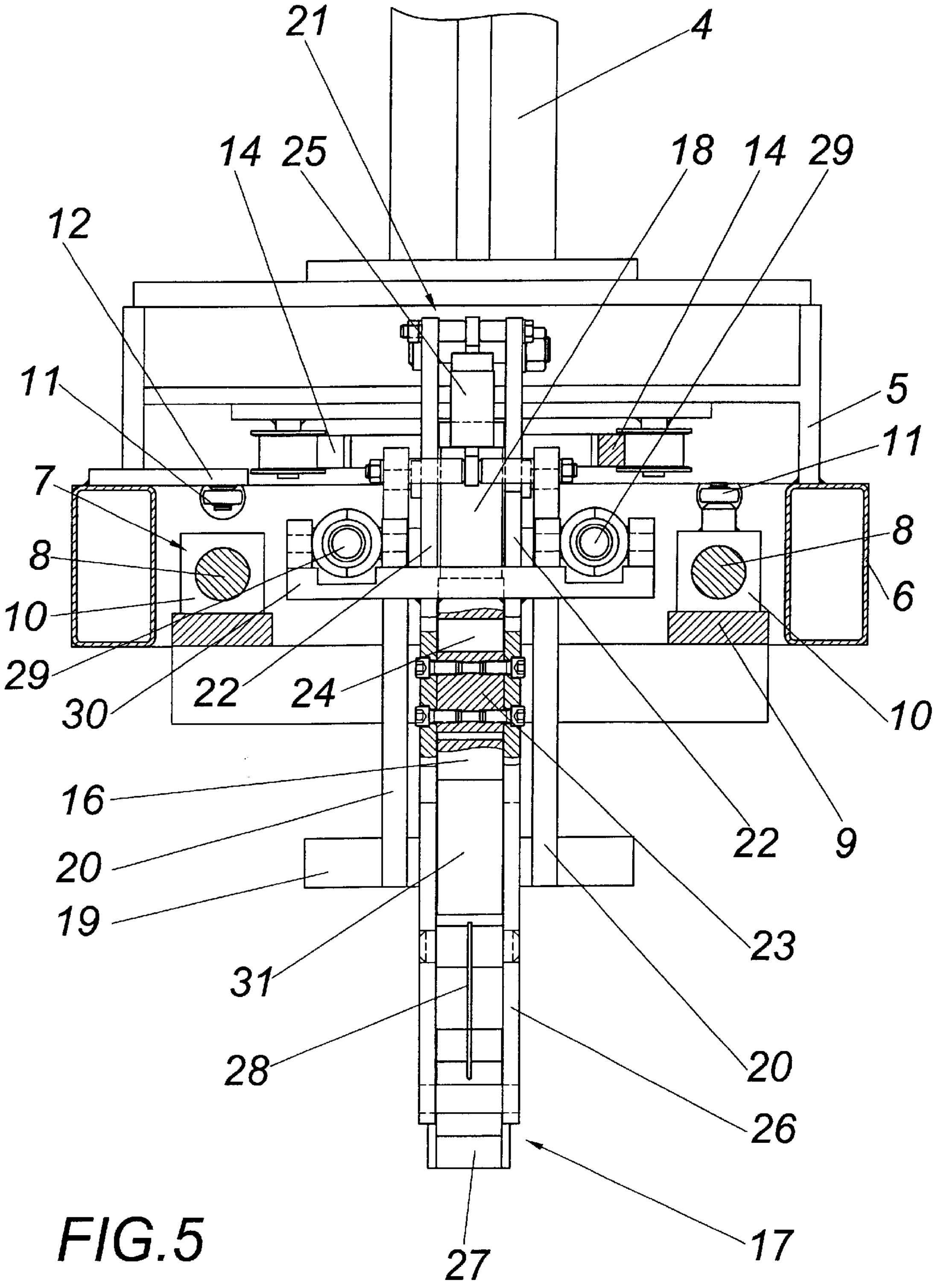
FIG. 5 is a section along line V—V of FIG. 3, on an enlarged scale.
Figure 6:
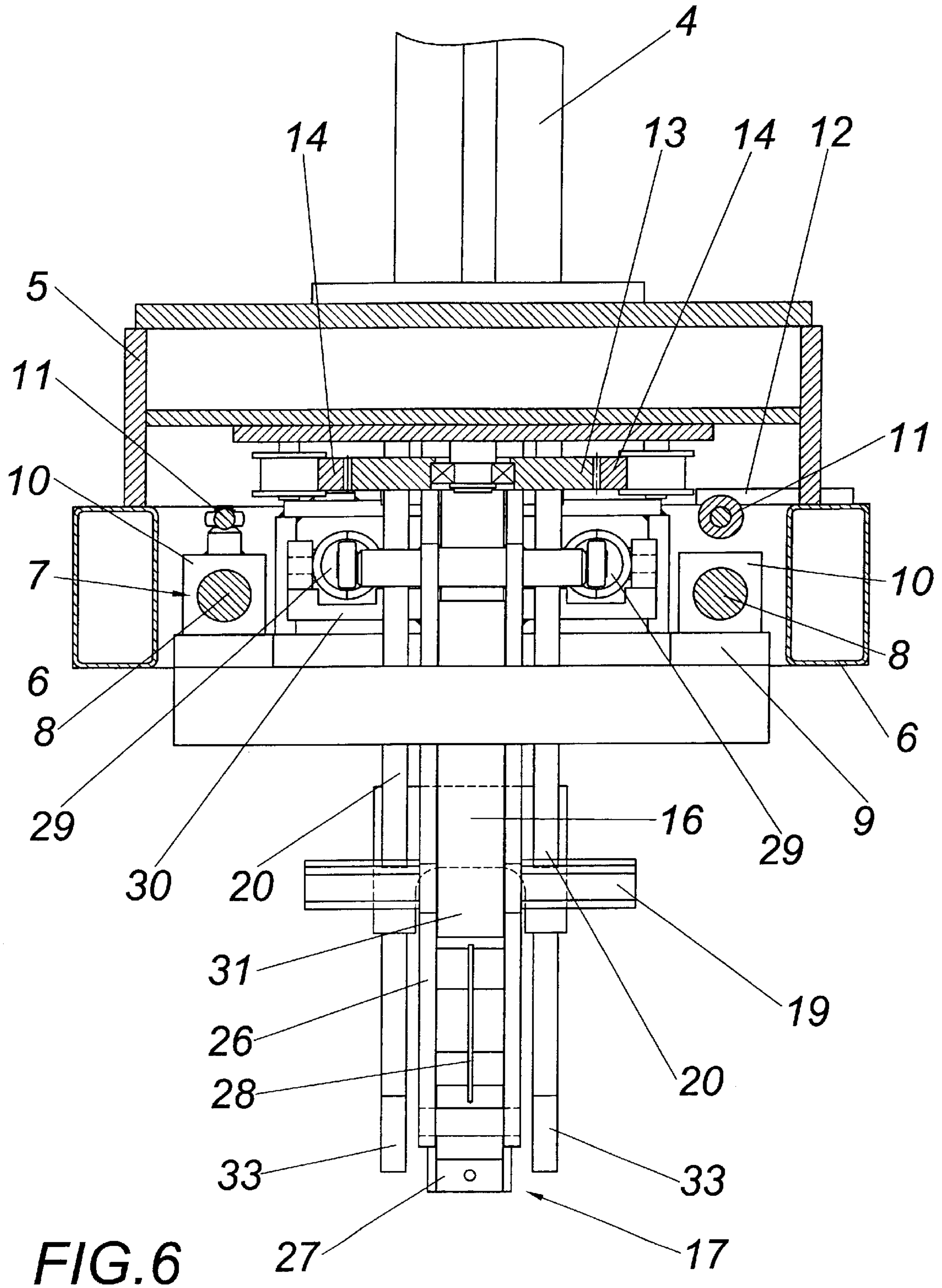
FIG. 6 is a section along line VI—VI of FIG. 1, on an enlarged scale.

To assist in loosening molding ring 1 from workpiece 3, hammers 33 are actuated by impact cylinders 34 to hit the undersides of pull-off catches 19, as also shown in FIG. 4. After the molding ring has been removed from the workpiece, clamping drives 29 are actuated to open clamping pliers 17 to enable the molding ring to be fully lifted off the workpiece and to be moved away.

The invention is not limited to the illustrated embodiment. For example, clamping pliers 17 may be replaced by clamping jaws 27 engaging only the outside of workpiece 3 to enable workpieces having very small inner diameters to be handled by the apparatus. Furthermore, additional pull-off catches may be provided angularly offset with respect to the clamping jaws so that the molding ring may be pulled off without danger of tilting. This danger occurs primarily with workpieces of larger diameter wherefore additional pull-off catches are not used when handling small-diameter workpieces since they would impair the gripping of such workpieces.

What is claimed is:

1. An apparatus for pulling a molding ring off a neck of a concrete tubular workpiece formed by the molding ring, which comprises (a) two clamping jaws positioned diametrically opposite each other with respect to a vertical axis of the tubular workpiece, the clamping jaws overlapping the molding ring from above and engaging the workpiece from the outside below the molding ring, (b) a supporting structure displaceably supporting the clamping jaws, (c) a lifting device arranged on the supporting structure for two pull off catches arranged diametrically opposite each other with respect to the molding ring, the pull-off catches subtending an undercut of the molding ring, and (d) carriages for the clamping jaws and pull-off catches, the carriages being adjustable in opposite directions along coaxial guides.

2. The apparatus of claim 1, comprising two additional clamping jaws positioned diametrically opposite each other with respect to the vertical axis of the tubular workpiece, the additional clamping jaws overlapping the molding ring from above and engaging the workpiece from the inside below the molding ring, the clamping jaws forming clamping pliers gripping the inside and the outside of the tubular workpiece.

3. The apparatus of claim 2, wherein the clamping pliers comprise double-armed clamping levers linked to the carriages, clamping drives engaging one end of each clamping lever and the clamping jaws being carried by the opposite ends of the clamping levers.

4. The apparatus of claim 3, wherein the clamping levers comprise two parts pivoted to opposite sides of a carriage body, the clamping jaws being pivotally positioned between the clamping lever parts.

5. The apparatus of claim 4, wherein the carriage body has two projections at respective sides of the molding ring, the clamping lever parts being pivoted to the projections.

6. The apparatus of claim 1, further comprising hammers for the pull-off catches, the hammers being mounted on the carriages at a radial distance from, and outwardly of, the pull-off catches.

7. The apparatus of claim 1, wherein the clamping jaws and the pull-off catches are mounted on common carriages.

8. The apparatus of claim 1, wherein the lifting device has a lifting unit for each pull-off catch.

9. The apparatus of claim 8, wherein a carrier for each pull-off catch is mounted on the carriages, each carrier being adjustable by a respective one of the lifting units along a lifting guide, and each pull-off catch being pivotally mounted on the carrier for pivoting about an axis extending tangentially to the vertical axis of the workpiece.

10. The apparatus of claim 9, wherein each lifting guide comprises a sliding block inserted in a guide recess of a carriage body, and each carrier comprises two carrier jaws connected to the sliding blocks, extending along the sides of the carriage body and projecting upwardly from the carriage body.

* * * * *